(12) United States Patent
Panikkar et al.

(10) Patent No.: US 12,079,849 B2
(45) Date of Patent: Sep. 3, 2024

(54) COMPUTING DEVICES WITH DUAL COMPUTING ARCHITECTURES FOR USE IN A SUBSCRIPTION MODEL

(71) Applicant: Dell Products L.P., Round Rock, TX (US)

(72) Inventors: Shibi Panikkar, Bangalore (IN); Dhilip S. Kumar, Bangalore (IN); Rohit Gosain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 17/723,951

(22) Filed: Apr. 19, 2022

(65) Prior Publication Data

US 2023/0334541 A1 Oct. 19, 2023

(51) Int. Cl.
*G06Q 30/0283* (2023.01)
*G06F 11/34* (2006.01)
*G06F 21/10* (2013.01)

(52) U.S. Cl.
CPC ......... *G06Q 30/0284* (2013.01); *G06F 11/34* (2013.01); *G06F 21/1078* (2023.08)

(58) Field of Classification Search
CPC ..... H04W 12/08; H04W 12/72; G06F 9/5072; G06F 16/951; H04L 63/101; H04L 67/63; H04L 67/565
See application file for complete search history.

(56) References Cited

U.S. PATENT DOCUMENTS

| | | | | |
|---|---|---|---|---|
| 9,445,312 | B2* | 9/2016 | Thalanany | H04W 36/0055 |
| 2009/0168726 | A1* | 7/2009 | Thalanany | H04W 36/0055 |
| | | | | 370/332 |
| 2016/0150396 | A1* | 5/2016 | Milhizer | H04L 43/16 |
| | | | | 455/405 |
| 2017/0064038 | A1* | 3/2017 | Chen | H04W 12/08 |
| 2021/0281586 | A1* | 9/2021 | Rasmussen | H04L 63/1466 |
| 2022/0353138 | A1* | 11/2022 | Wyszkowski | H04L 41/5045 |
| 2023/0185580 | A1* | 6/2023 | Cohen | G06F 8/63 |
| | | | | 713/2 |

OTHER PUBLICATIONS

Wikipedia, "x86," https://en.wikipedia.org/w/index.php?title=X86&oldid=1082020938, Apr. 10, 2022, 30 pages.

(Continued)

*Primary Examiner* — Mahran Y Abu Roumi
(74) *Attorney, Agent, or Firm* — Ryan, Mason & Lewis, LLP

(57) ABSTRACT

Computing devices with dual computing architectures for use in a subscription model are disclosed. For example, a computing device comprises a first computing architecture comprising a first set of computing resources dedicated to executing one or more first computing tasks, wherein the one or more first computing tasks are associated with a subscription-based user of the computing device. The computing device further comprises a second computing architecture comprising a second set of computing resources dedicated to executing one or more second computing tasks, wherein the one or more second computing tasks are associated with a subscription-based provider of the computing device.

20 Claims, 6 Drawing Sheets

(56) References Cited

OTHER PUBLICATIONS

Wikipedia, "Function as a Service," https://en.wikipedia.org/w/index.php?title=Function_as_a_service&oldid=1059478569, Dec. 9, 2021, 2 pages.
Wikipedia, "ARM Architecture Family," https://en.wikipedia.org/w/index.php?title=ARM_architecture_family&oldid=1082837032, Apr. 15, 2022, 41 pages.
Rancher, "Architecture," https://rancher.com/docs/k3s/latest/en/architecture/ Accessed Apr. 19, 2022, 6 pages.

* cited by examiner

COMPUTING DEVICES WITH DUAL COMPUTING ARCHITECTURES FOR USE IN A SUBSCRIPTION MODEL

FIELD

The field relates generally to computing devices, and more particularly to computing devices with dual computing architectures for use in a subscription model.

BACKGROUND

Subscription commerce is growing at an exponential rate. For example, subscription services have been proposed for computing devices such as laptops, desktops, etc. In such a subscription model, a customer does not necessarily purchase a computing device from a vendor (e.g., original equipment manufacturer or other subscription provider) but rather subscribes to a service for use of a computing device configured as needed/desired by the customer.

When a computing device subscription model is employed, recurring billing can be fixed term-based (e.g., monthly, annually) or usage-based. In either case, the subscription provider collects usage data, laptop health data, etc. in order to serve the customer better. For example, if the battery health of the computing device is poor, the subscription provider may need to replace the battery before the customer contacts them about it for better customer experience. Also, if the customer needs additional software, drivers, or other computing device functionalities, the provider should be able to seamlessly provision these additional features.

In one example of a laptop/desktop subscription model, a software module (e.g., a vendor agent) is installed in the computing device and given administrative privileges to collect user consumption data and health data over a public network. This subscription model approach exposes multiple technical issues. For example, in the existing approach, the vendor agent uses the main computing resources of the computing device subscribed by the customer, i.e., the vendor agent is installed in the main CPU and main memory. As such, the vendor agent running in the computing device can degrade performance of the computing resources of the computing device, which are the customer-subscribed computing resources. Still further, since the vendor agent resides in the main CPU, any security vulnerability that the vendor agent exposes could lead to exposure of the customer's data to malicious actors (e.g., hackers).

SUMMARY

Illustrative embodiments provide computing devices with dual computing architectures for use in a subscription model. For example, in one illustrative embodiment, a computing device comprises a first computing architecture comprising a first set of computing resources dedicated to executing one or more first computing tasks, wherein the one or more first computing tasks are associated with a subscription-based user of the computing device. The computing device further comprises a second computing architecture comprising a second set of computing resources dedicated to executing one or more second computing tasks, wherein the one or more second computing tasks are associated with a subscription-based provider of the computing device.

Advantageously, illustrative embodiments isolate the first set of computing resources from the second set of computing resources, thus eliminating or reducing any computing or storage load on the first set of computing resources when the one or more second computing tasks are executed in the computing device. Furthermore, illustrative embodiments protect user and/or data privacy and provide other security measures.

These and other illustrative embodiments include, without limitation, apparatus, systems, methods and computer program products comprising processor-readable storage media.

DETAILED DESCRIPTION

As mentioned, in a subscription-based computing device model, a customer subscribes to a service for use of a computing device such as, by way of example, a laptop, which is provided by a vendor. The customer receives the laptop with a given computing resource configuration and is then charged based on the computing resource usage (e.g., CPU and memory) involved with running the customer's computing tasks. However, usage is typically tracked by a vendor agent running in the same computing resources that run the customer's computing tasks. This presents significant technical problems for the customer since the vendor agent can degrade the performance of the laptop, and any reporting done by the vendor agent can pose security and/or privacy concerns.

Illustrative embodiments overcome the above and other technical problems by, inter alia, providing a subscription-based computing device with a dual computing architecture, i.e., a first computing architecture and a second computing architecture resident on the same computing device. More particularly, the first computing architecture comprises customer computing resources, while the second computing architecture comprises vendor or provider computing resources. In this manner, customer computing tasks are executed in one computing architecture, while the vendor agent tasks are executed in another computing architecture, thus isolating customer computing resources from vendor computing resources. Because of the dual computing isolation approach, execution of the vendor agent tasks does not utilize customer computing resources and so have no impact, or at least a significant reduction as compared to the existing approach, on their performance. Further, the security/privacy vulnerabilities to customer data that the existing approach exposes are eliminated or significantly reduced since, in accordance with illustrative embodiments, the vendor tasks are executed in a dedicated secure vendor computing resource environment and any external reporting is performed with a secure communication protocol.

Figure 1:
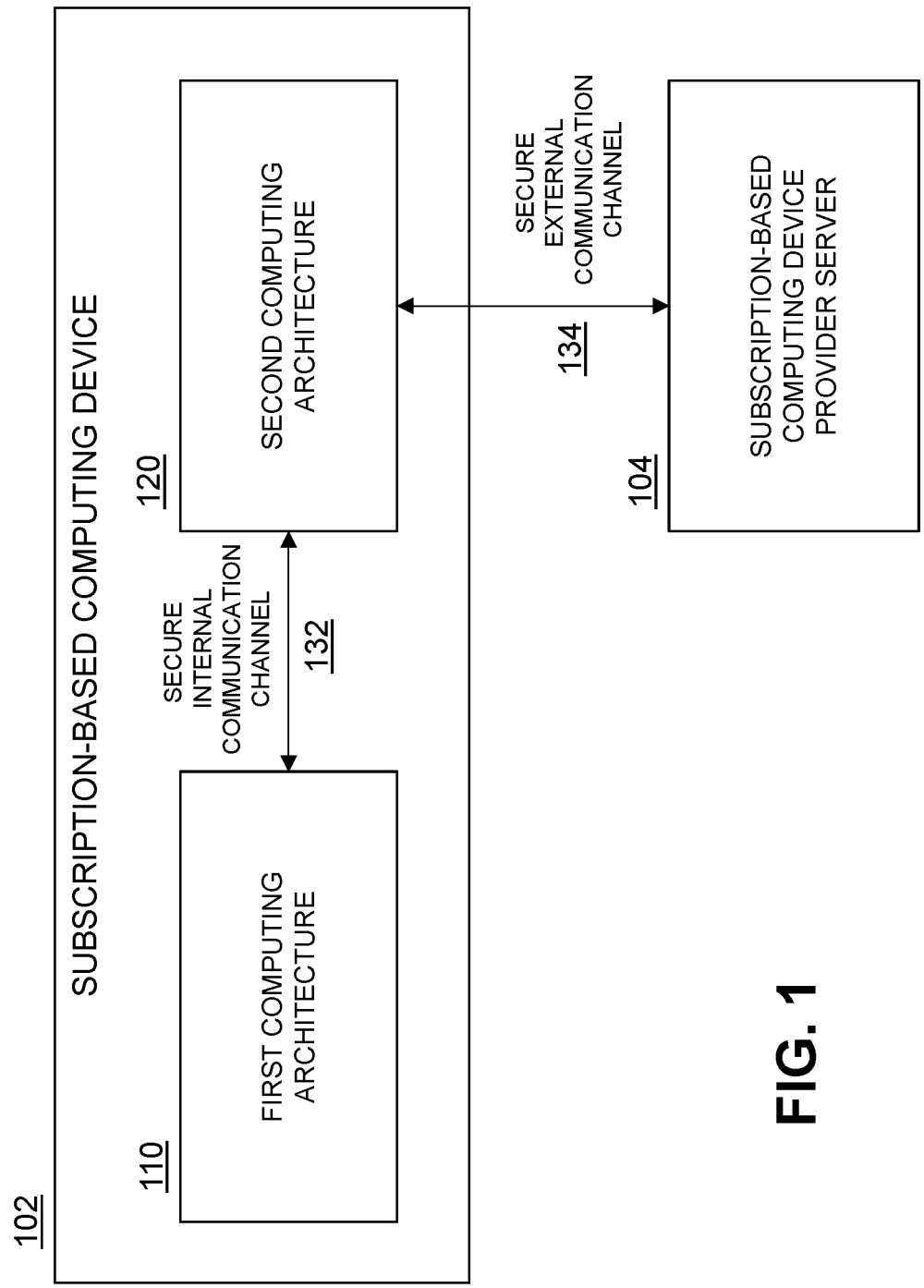
FIG. 1 illustrates an information processing system with a subscription-based computing device with a dual computing architecture according to an illustrative embodiment.

FIG. 1 illustrates an information processing system 100 with a subscription-based computing device with a dual computing architecture according to an illustrative embodiment. As generally shown, information processing system 100 comprises a subscription-based computing device 102 (hereinafter also referred to as computing device 102) and a subscription-based computing device provider server 104 (hereinafter also referred to as provider server 104).

Computing device 102 is configured with a dual computing architecture comprising a first computing architecture 110 and a second computing architecture 120. First and second computing architectures 110 and 120 are operatively coupled via a secure internal communication channel 132, while second computing architecture 120 and provider server 104 are operatively coupled via a secure external communication channel 134. Note that the terms internal and external with respect to the secure communication channels 132 and 134 are intended to be from the perspective of computing device 102.

As will be further explained, in one or more illustrative embodiments, provider server 104 is managed by a vendor, in accordance with a subscription model, who supplies a customer with computing device 102 for use in performing customer computing tasks. By way of example only, the customer usage can be: (i) business-based where the customer computing tasks are part of commercial and/or custom business software (e.g., word processing programs, spreadsheet programs, email programs, etc.) that the customer runs on computing device 102; (ii) personal-based where the customer tasks are part of commercial and/or custom non-business software (e.g., video gaming-related programs, school-related programs, social media-related programs, etc.) that the customer runs on computing device 102; (iii) a combination of business-based and personal-based usages; and (iv) other customer computing task usages as may be needed/wanted by the customer. In accordance with illustrative embodiments, the customer computing tasks are performed exclusively in first computing architecture 110.

It is to be understood that, prior to delivering computing device 102 to the customer, the vendor installs one or more software programs (e.g., a vendor agent) on computing device 102 which, as mentioned, perform subscription functions (i.e., vendor computing tasks) such as computing resource usage tracking, computing device management, and other functions as agreed upon by the customer and vendor in accordance with the subscription. In accordance with illustrative embodiments, the vendor computing tasks are performed exclusively in second computing architecture 120.

Since customer computing tasks are performed exclusively in first computing architecture 110 and vendor computing tasks are performed exclusively in second computing architecture 120, computing device 102 isolates customer computing resources from vendor computing resources which, inter alia, ensures that vendor computing tasks do not degrade the performance of computing device 102 with respect to execution of the customer computing tasks. Further, since first and second computing architectures 110 and 120 are operatively coupled via a secure internal communication channel 132, while second computing architecture 120 and provider server 104 are operatively coupled via a secure external communication channel 134, security/privacy vulnerabilities to customer data that the existing approach exposes are eliminated or significantly reduced in accordance with illustrative embodiments.

Figure 2:
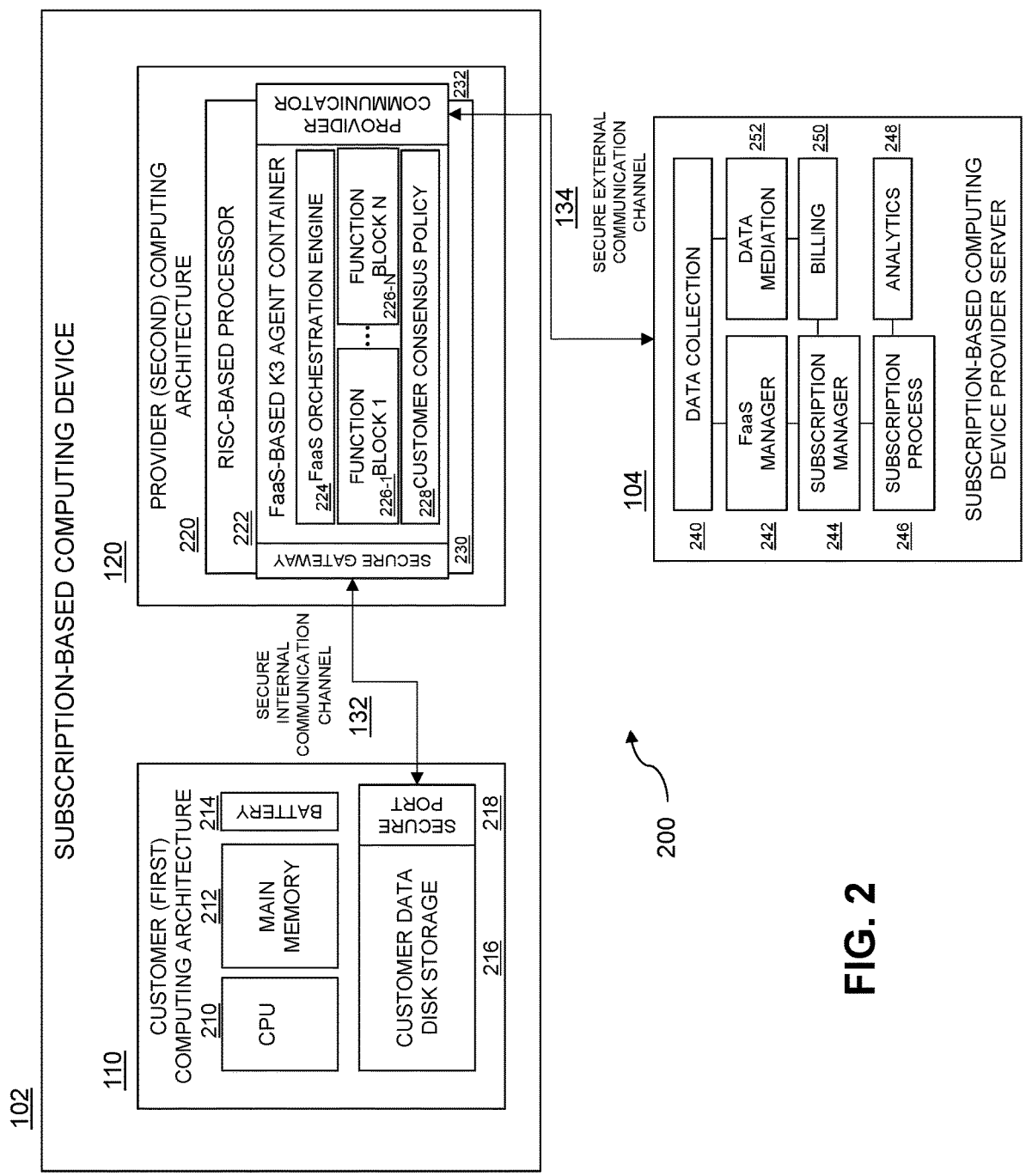
FIG. 2 illustrates an information processing system with a subscription-based computing device with a dual computing architecture according to another illustrative embodiment.

FIG. 2 illustrates an information processing system 200 with a subscription-based computing device with a dual computing architecture according to another illustrative embodiment. More particularly, information processing system 200 can be considered an illustrative implementation of information processing system 100 of FIG. 1 depicting details of computing device 102 with respect to first computing architecture 110 (also referred to herein as customer computing architecture 110), and second computing architecture 120 (also referred to herein as provider computing architecture 120). Further, the FIG. 2 embodiment depicts illustrative implementation details of provider server 104.

More particularly, as shown, customer computing architecture 110 comprises a set of computing resources comprising a CPU 210, a main memory 212, a battery 214, and a customer data disk storage 216. Customer data disk storage 216 is operatively coupled to a secure port 218. Note that, in alternative embodiments, customer computing architecture 110 can comprise different quantities of CPU 210, main memory 212, battery 214, and customer data disk storage 216, than the quantities illustratively shown, as well as other computing resources not expressly shown. In one or more illustrative embodiments, customer computing architecture 110 comprises an x86 computing architecture executing, by way of example only, a Windows or Linux operating system. The x86 computing architecture is an instruction set architecture (ISA) series for computer processors developed by Intel Corporation of Santa Clara, CA. More particularly, x86 is the term used to denote the microprocessor family based on the Intel 8086 and 8088 microprocessors. These microprocessors ensure backward compatibility for full instruction set architectures (as compared to a reduced instruction set architecture as will be explained below), which initially started with an 8-bit instruction set before upgrading to 16- and 32-bit instruction sets.

Further, as shown, provider computing architecture 120 comprises a reduced instruction set computer (RISC)-based processor 220. In one or more illustrative embodiments, RISC-based processor 220 comprises an ARM processor which is one of a family of processors based on the RISC architecture developed by Advanced RISC Machines (ARM) of San Jose, CA. RISC-based processors are suitable for execution of code in resource-constrained environments and can run resource-constrained operating systems such as, but not limited to, an Android operating system. In illustrative embodiments, a vendor agent is considered code executable in a resource-constrained environment and which is configured to operate as efficiently as possible within computing device 102 in terms of a physical footprint and/or an energy footprint.

As further shown in FIG. 2, RISC-based processor 220 is configured to support a Function-as-a-Service (FaaS) framework for an edge computing implementation. More particularly, FaaS provides a serverless way to execute modular pieces of code (functions) consistent with an edge computing paradigm. Still further, RISC-based processor 220 is configured to support execution of such functions within a container orchestration framework known as K3s from Kubernetes of San Francisco, CA. More particularly, functions and other modules are executed within at least one container. As shown, FaaS-based K3 agent container 222 comprises a FaaS orchestration engine 224, a set of function blocks 226-1, . . . , 226-N (hereinafter collectively referred to as function blocks 226, and individually as function block 226), and a customer consensus policy 228 (which is an example of one or more management policies that can be implemented in provider computing architecture 120). FaaS-based K3 agent container 222 also comprises a secure gateway 230 and a provider communicator 232. Secure gateway 230, as will be further explained, along with secure port 218 of customer computing architecture 110, are part of secure internal communication channel 132 that enables limited access by provider computing architecture 120 to customer data stored in customer data disk storage 216 consistent with the agreed upon terms of the subscription between the customer and the vendor. Similarly, provider communicator 232, as will be further explained, is part of secure external communication channel 134 that enables secure data exchange between provider computing architecture 120 and provider server 104. In one or more illustrative embodiments, a secure communication protocol is used so that data can be exchanged over a public network such as, but not limited to, the Internet.

As still further shown in FIG. 2, provider server 104 comprises a set of modules comprising a data collection module 240, a FaaS manager module 242, a subscription manager module 244, a subscription process module 246, an analytics module 248, a billing module 250, and a data mediation module 252.

Advantageously, based on the configuration of computing device 102 with a dual computing architecture comprising customer computing architecture 110 and provider computing architecture 120, each dedicated to execute separate computing tasks as explained herein, illustrative embodiments reduce the burden of orchestrating subscription computing. Provider computing architecture 120, by subscribing to system logs stored in customer data disk storage 216, monitors and measures the performance of computing device 102.

By way of one example, one or more of function blocks 226 can be configured with one or more usage metering functions (application or code) that access the customer data on customer data disk storage 216. For example, one usage metering function can be configured for monitoring usage with respect to CPU 210 and another usage metering function can be configured for monitoring usage with respect to main memory 212. Alternatively, a usage metering function can be configured to monitor CPU 210 and main memory 212 and/or other computing resources in customer computing architecture 110. As such, one or more usage metering functions can measure the usage by subscribing to the system logs stored in customer data disk storage 216.

It is to be appreciated that computing power can vary by consumers and their subscription types such as business, student, and home purposes (e.g., gaming). Advantageously, the computing device owner, i.e., the subscription-based computing device provider (e.g., Dell Technologies), can change the function blocks 226 and/or policy type (e.g., customer consensus policy 228) by using provider server 104 and one or more of its modules (i.e., data collection module 240, FaaS manager module 242, subscription manager module 244, subscription process module 246, analytics module 248, billing module 250, and data mediation module 252) to access provider computing architecture 120. Due to the nature of secure external communication channel 134, customer data is protected even when one or more modules in provider server 104 connect to one or more function blocks 226 and any other components running in FaaS-based K3 agent container 222 of RISC-based processor 220. Illustrative embodiments can also enable an offline monitoring service without connecting to a centralized server, such as provider server 104, as will be further explained below.

Continuing reference to FIG. 2, in some illustrative embodiments, RISC-based processor 220 can be configured with a dedicated operating system (by way of example only, Android OS) to support the operations described herein. Still further, FaaS-based K3 agent container 222 along with FaaS orchestration engine 224 are configured to enable execution of function blocks 226 as service applications or microservices. Function blocks 226 can provide functions such as, but not limited to, usage tracking, usage details, usage protection, anomaly detection and analysis, imaging and re-imaging functions, license key management, subscription payment services, an artificial intelligence/machine learning (AI/ML) algorithm to predict failure rate, etc.

In some illustrative embodiments, FaaS-based K3 agent container 222 is a lightweight Kubernetes container (K3s) with plug-and-play function blocks (226) that can be governed from provider server 104. K3 is a highly available, certified Kubernetes distribution designed for production workloads in unattended, resource-constrained, remote locations or inside Internet of Things (IoT) appliances. K3 is packaged as a single less than 40 MB binary that reduces the dependencies and steps needed to install, run and auto-update a production Kubernetes cluster. In illustrative embodiments with an ARM device as RISC-based processor 220, binaries and multi-arc images are supported.

Secure gateway 230, which connects RISC-based processor 220 with secure port 218 of customer computing architecture 110, is configured in illustrative embodiments to enable: (i) signing data exchange consensus with the customer (as per customer consensus policy 228); (ii) receiving or on-demand pulling logs from customer data disk storage 216 to enable FaaS orchestration engine 224 to process function blocks 226 mentioned above through a secure protocol; (iii) validating subscription status to prevent the unauthorized usage of the computing resources of customer computing architecture 110; (iv) location tracking using a global positioning system (GPS) of the subscribed computing device 102; and (v) signaling to re-image the system based on the user's consent at the end of the subscription (note that an image is taken at the start of the subscription).

In one or more illustrative embodiments, secure gateway 230 is exposed to time-series streaming data from the logs in customer data disk storage 216. Time-series storage is important to access the log information with details. Also, secure gateway 230 is accessed to call an application programming interface (API) that is being exposed to customer computing architecture 110 (e.g., x86 architecture) for validation purposes. This is further depicted in FIG. 3 as explained below.

Figure 3:
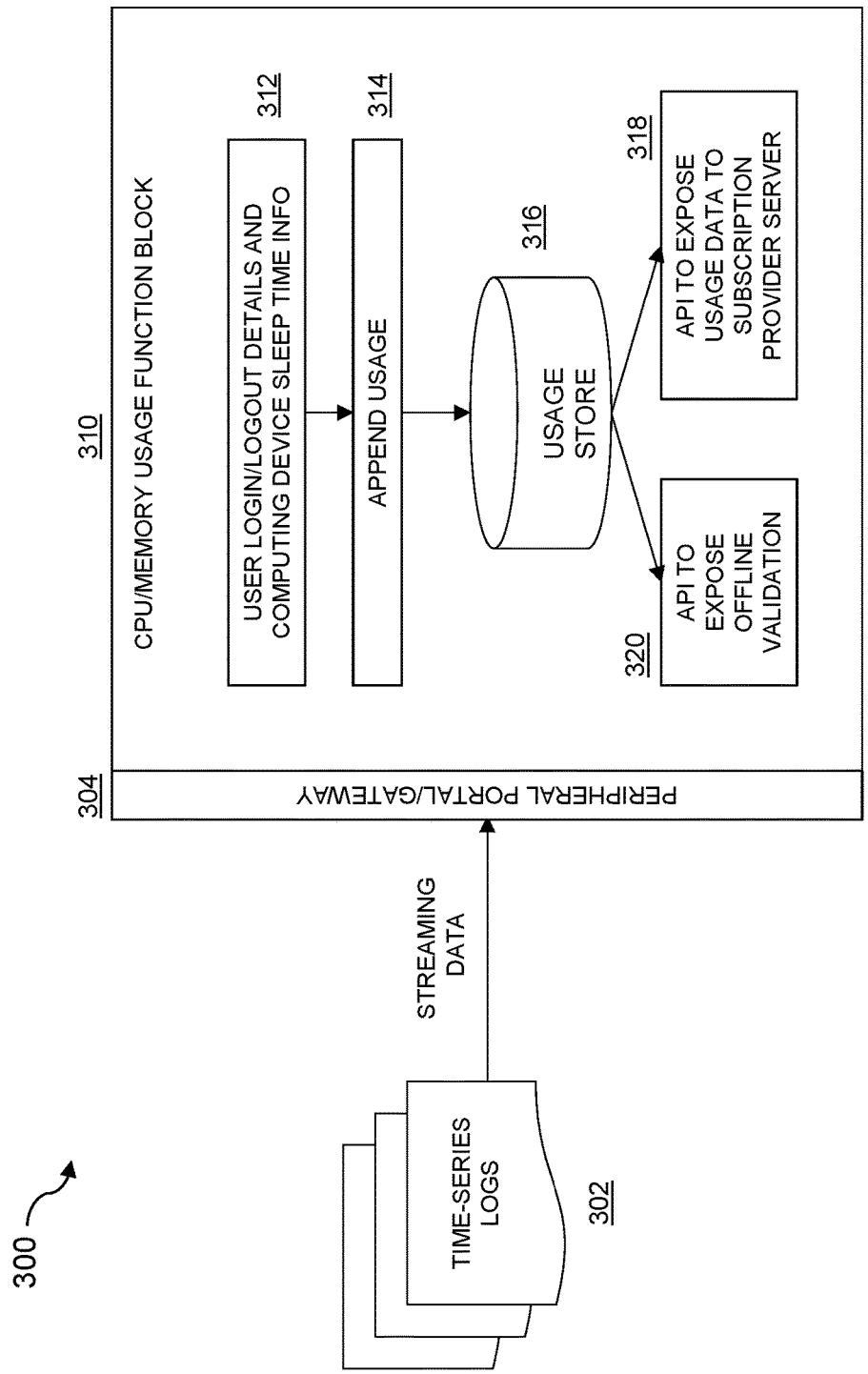
FIG. 3 illustrates an exemplary subscription-based function block configured to execute in a subscription-based computing device with a dual computing architecture according to an illustrative embodiment.

FIG. 3 illustrates an exemplary use case 300 for a subscription-based function block. As shown, one or more time-series logs 302 (from customer data disk storage 216) are streamed to peripheral portal/gateway 304 (equivalent to secure gateway 230) and are provided to CPU/memory usage function block 310 (equivalent to one or more of function blocks 226). From the one or more time-series logs 302, CPU/memory usage function block 310 extracts user login/logout details and computing device sleep time information in step 312 and appends the usage data in step 314 for storage in usage store 316. Note that the user login/logout and sleep time (inactivity) data for computing device 102 is used to determine usage in terms of the subscription. CPU/memory usage function block 310 calculates usage independently and communicates, via API 318, the details in regular intervals to a centralized server, e.g., provider server 104. Also, CPU/memory usage function block 310 exposes an API 320 to validate the expiration of the subscription when the user logs in to computing device 102.

Furthermore, assume a user initially subscribes to a base plan then wants to upgrade to a premium plan. In the base plan, assume function blocks 226 only include a usage metering function, e.g., as shown in use case 300 of FIG. 3. However, in the premium plan, assume the user gets a data back-up function and a GPS theft recovery function. In a conventional laptop, remote provisioning of the software and collection of usage of data back-up for billing would be a technical problem. However, with the proposed dual computing architecture according to illustrative embodiments, the subscription provider needs simply to add data back-up and GPS theft recovery function blocks 226 in RISC-based processor 220, and FaaS orchestration engine 224 manages the local provisioning and collection of data in a secure manner as explained herein.

As mentioned, illustrative embodiments can be implemented in various use cases. For example, in a gaming subscription model use case, the customer can subscribe to use a laptop provided by a given laptop provider for their regular gaming usages. Assume then that the customer needs a new higher-end laptop. In accordance with the subscription model, the customer can exchange the old laptop for the new one and the subscription will be upgraded. The cost for the customer can be significantly reduced, and the customer need not worry about asset disposal or end of life of the device.

In another exemplary use case, in a virtual academic environment, students are in online classes and thus need laptops to connect. Affording the laptop can be challenging. The subscription model according to illustrative embodiments can serve as a useful model. More particularly, the customer can return the laptop once the online class ends. Also, the computer's utilization for the student subscription is only during classes and can be calculated only when the device is in use.

Figure 4:
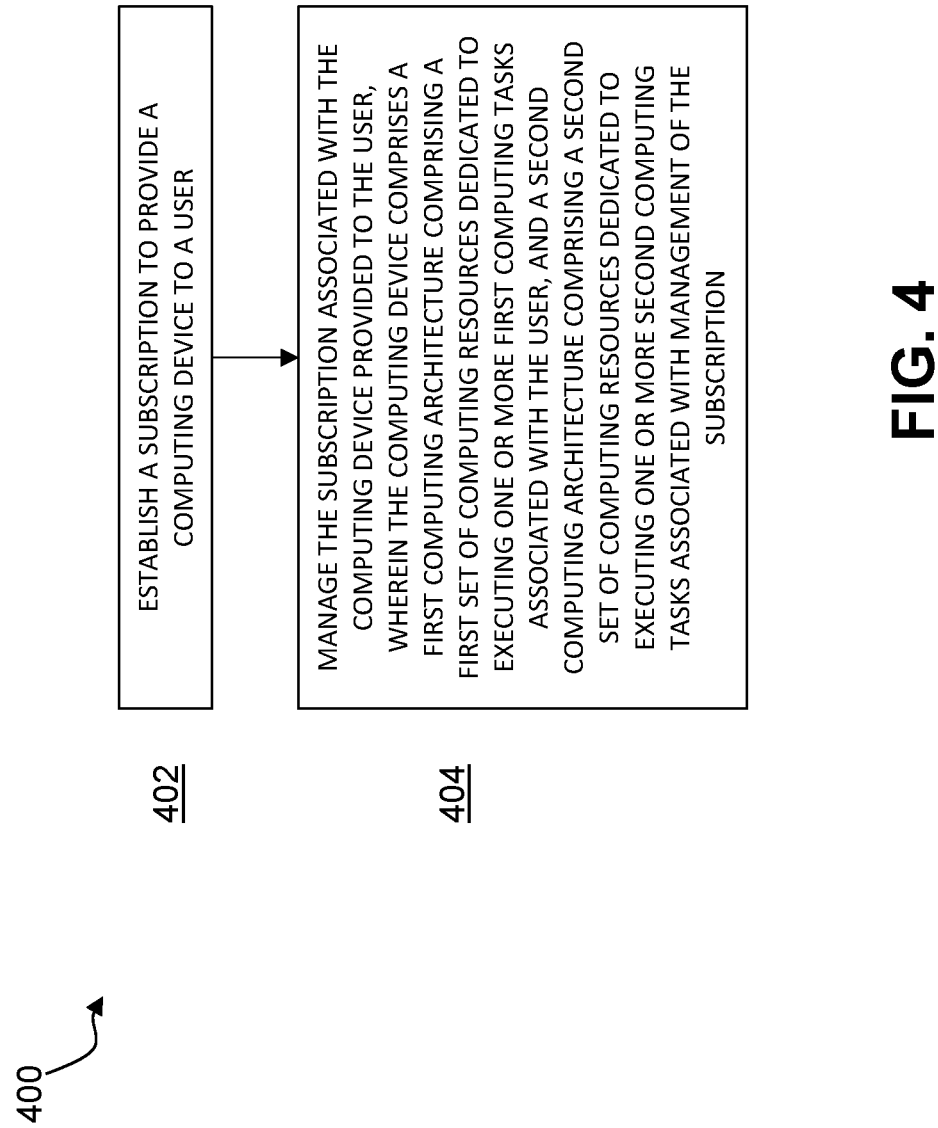
FIG. 4 illustrates a methodology executed in accordance with a subscription-based computing device with a dual computing architecture according to an illustrative embodiment.

FIG. 4 illustrates a methodology 400 executed in accordance with a subscription-based computing device with a dual computing architecture according to an illustrative embodiment. It is to be appreciated that, in one or more illustrative embodiments, methodology 400 can be implemented by provider server 104 and its modules in FIGS. 1 and 2.

As shown in FIG. 4, step 402 assumes establishment of a subscription to provide a computing device to a user (i.e., customer) by a provider (i.e., vendor). Step 404 manages the subscription associated with the computing device provided to the user. The computing device comprises a first computing architecture comprising a first set of computing resources dedicated to executing one or more first computing tasks associated with the user, and a second computing architecture comprising a second set of computing resources dedicated to executing one or more second computing tasks associated with management of the subscription.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement management functionality for a dual computing architecture computing device subscription will now be described in greater detail with reference to FIGS. 5 and 6. It is to be appreciated that systems and processes described in the context of FIGS. 1-4 can be performed via the platforms in FIGS. 5 and/or 6 but may also be implemented, in whole or in part, in other information processing systems in other embodiments.

Figure 5:
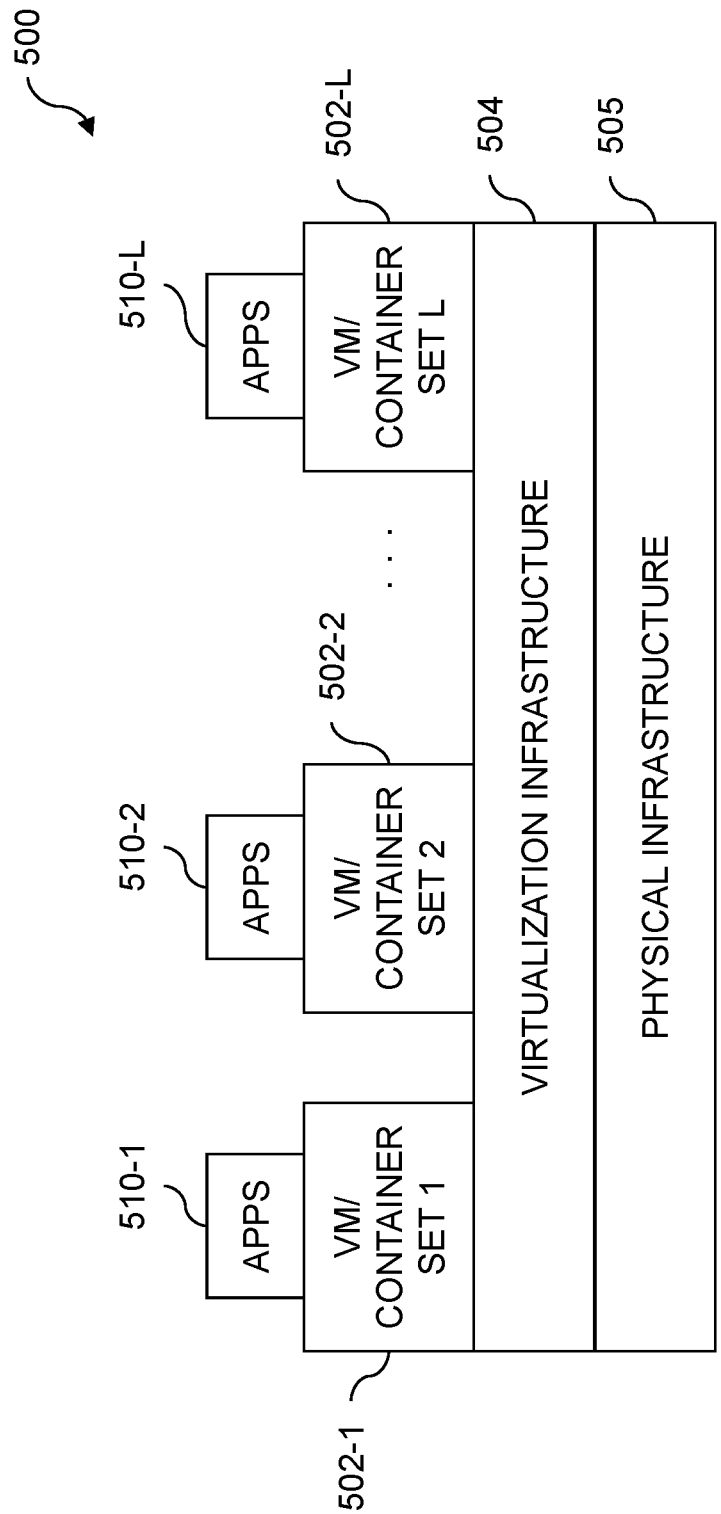
FIGS. 5 and 6 respectively illustrate examples of processing platforms that may be utilized to implement at least a portion of an information processing system with a subscription-based computing device with a dual computing architecture according to one or more illustrative embodiments.
Figure 6:
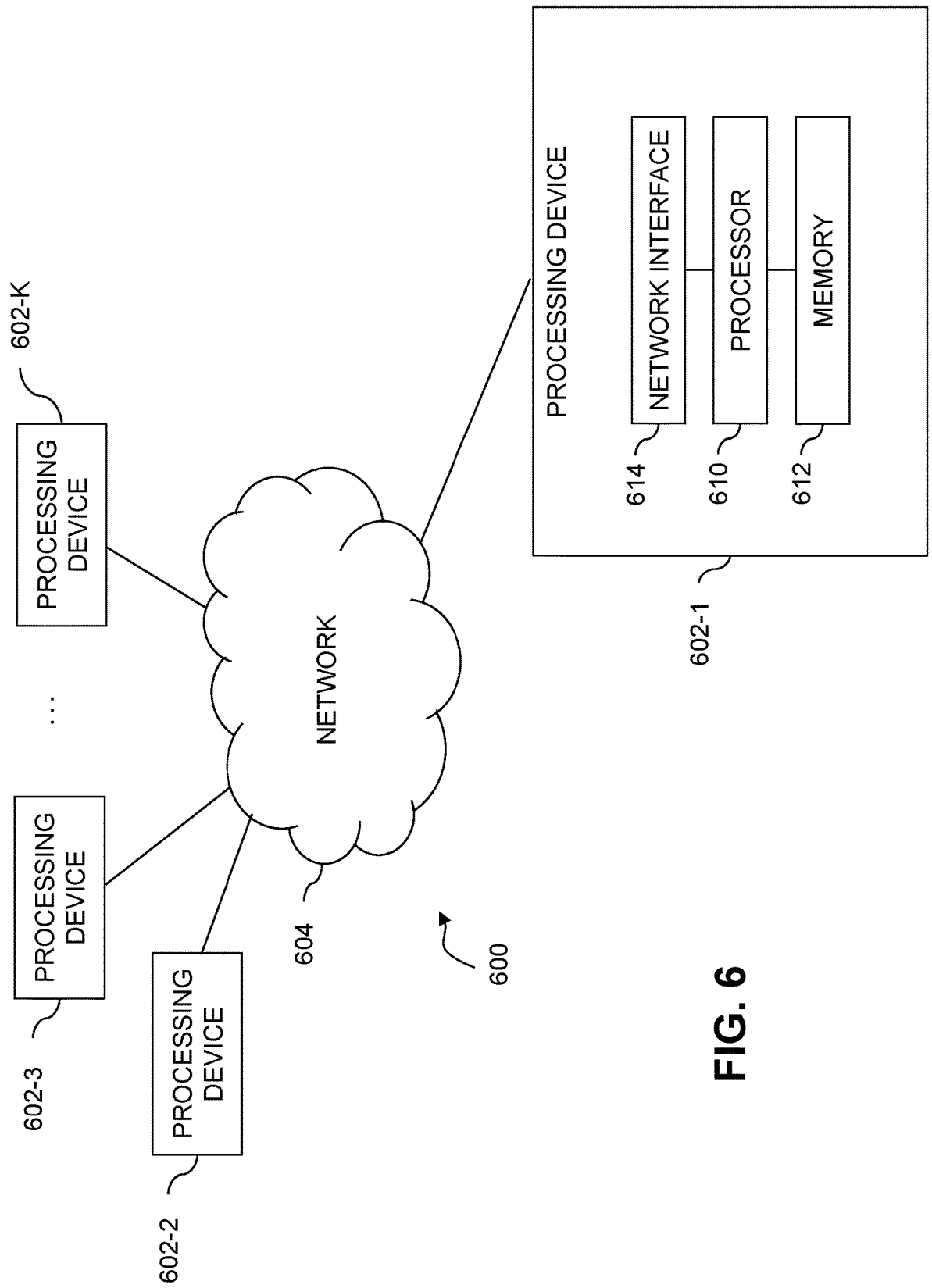

FIG. 5 shows an example processing platform comprising cloud infrastructure 500. The cloud infrastructure 500 comprises a combination of physical and virtual processing resources that may be utilized to implement at least a portion of the information processing systems described herein. The cloud infrastructure 500 comprises multiple VM/container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure.

The cloud infrastructure 500 further comprises sets of applications 510-1, 510-2, . . . 510-L running on respective ones of the VM/container sets 502-1, 502-2, . . . 502-L under the control of the virtualization infrastructure 504. The VM/container sets 502 may comprise respective sets of one or more containers.

In some implementations of the FIG. 5 embodiment, the VM/container sets 502 comprise respective containers implemented using virtualization infrastructure 504 that provides operating system level virtualization functionality, such as support for Kubernetes-managed containers.

As is apparent from the above, one or more of the processing modules or other components of system 100/200 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100/200 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system environment 100/200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, cloud platforms, cloud services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computing device comprising:
a dual computing architecture, the dual computing architecture comprising:
a first computing architecture comprising a first set of computing resources dedicated to executing one or more first computing tasks, wherein the one or more first computing tasks are associated with a subscription-based customer of the computing device; and
a second computing architecture comprising a second set of computing resources dedicated to executing one or more second computing tasks, wherein the one or more second computing tasks are associated with a subscription-based provider of the computing device;
wherein the first computing architecture and the second computing architecture are operatively coupled by a secure internal communication channel within the computing device, and functionally isolated from one another such that while the first set of computing resources are enabled to securely communicate with the second set of computing resources, the first set of computing resources are isolated from executing any of the one or more second computing tasks;
wherein the second computing architecture is further operatively coupled by a secure external communication channel to at least one of: a server remote from the computing device and associated with the subscription-based provider; and an offline validation process, the server being manageable by the subscription-based provider of the computing device in accordance with a subscription model, the subscription-based provider of the computing device being a supplier of the computing device to the subscription-based customer; and
wherein the first set of computing resources comprises a full instruction set architecture-based processor and the second set of computing resources comprises a reduced instruction set computer-based processor.

2. The computing device of claim 1, wherein the one or more second computing tasks associated with the subscription-based provider of the computing device comprise one or more management functions associated with a subscription between the subscription-based customer and the subscription-based provider for the subscription-based customer to use the computing device.

3. The computing device of claim 2, wherein the one or more management functions further comprise a usage metering function configured to track usage of one or more of the first set of computing resources in the first computing architecture dedicated to executing the one or more first computing tasks.

4. The computing device of claim 3, wherein the one or more of the first set of computing resources tracked by the usage metering function comprise a central processing unit and a main memory.

5. The computing device of claim 2, wherein the one or more management functions further comprise one or more of an anomaly detection function, a data back-up function, a license key manager function, a subscription change function, and an imaging-based function.

6. The computing device of claim 2, wherein the second set of computing resources are configured to enable changing of the one or more management functions in response to a change to the subscription.

7. The computing device of claim 2, wherein the second set of computing resources are configured to enable changing of one or more management policies in response to a change to the subscription.

8. The computing device of claim 2, wherein the one or more management functions are configured to collect data from a data disk storage in the first computing architecture via the secure internal communication channel between the first computing architecture and the second computing architecture.

9. The computing device of claim 1, wherein the reduced instruction set computer-based processor is configured to support a function-as-a-service framework.

10. The computing device of claim 1, wherein the reduced instruction set computer-based processor is configured to support a container orchestration framework.

11. A method comprising:
managing a subscription associated with a computing device provided to a customer in accordance with the subscription, wherein the computing device comprises a dual computing architecture, the dual computing architecture comprising a first computing architecture comprising a first set of computing resources dedicated to executing one or more first computing tasks associated with the customer and associated with a subscription-based customer of the computing device, and a second computing architecture comprising a second set of computing resources dedicated to executing one or more second computing tasks associated with management of the subscription and associated with a subscription-based provider of the computing device;
wherein the first computing architecture and the second computing architecture are operatively coupled by a secure internal communication channel within the computing device, and functionally isolated from one another such that while the first set of computing resources are enabled to securely communicate with the second set of computing resources, the first set of computing resources are isolated from executing any of the one or more second computing tasks;
wherein the second computing architecture is further operatively coupled by a secure external communication channel to at least one of: a server remote from the computing device and associated with the subscription-based provider; and an offline validation process, the server being manageable by the subscription-based provider of the computing device in accordance with a subscription model, the subscription-based provider of the computing device being a supplier of the computing device to the subscription-based customer;
wherein the first set of computing resources comprises a full instruction set architecture-based processor and the second set of computing resources comprises a reduced instruction set computer-based processor; and
wherein the managing is executed by a processor operatively coupled to a memory.

12. The method of claim 11, wherein managing the subscription further comprises causing a change to one or more management functions associated with the one or more second computing tasks in response to a change to the subscription.

13. The method of claim 11, wherein managing the subscription further comprises causing a change to one or more management policies associated with the one or more second computing tasks in response to a change to the subscription.

14. The method of claim 11, wherein the processor and memory are part of the server coupled to the second computing architecture via the secure external communication channel.

15. A computer program product comprising a non-transitory processor-readable storage medium having stored therein program code of one or more software programs, wherein the program code, when executed by at least one processor, causes the at least one processor to:
manage a subscription associated with a computing device provided to a customer in accordance with the subscription, wherein the computing device comprises a dual computing architecture, the dual computing architecture comprising a first computing architecture comprising a first set of computing resources dedicated to executing one or more first computing tasks associated with the customer and associated with a subscription-based customer of the computing device, and a second computing architecture comprising a second set of computing resources dedicated to executing one or more second computing tasks associated with management of the subscription and associated with a subscription-based provider of the computing device;
wherein the first computing architecture and the second computing architecture are operatively coupled by a secure internal communication channel within the computing device, and functionally isolated from one another such that while the first set of computing resources are enabled to securely communicate with the second set of computing resources, the first set of computing resources are isolated from executing any of the one or more second computing tasks;
wherein the second computing architecture is further operatively coupled by a secure external communication channel to at least one of: a server remote from the computing device and associated with the subscription-based provider; and an offline validation process, the server being manageable by the subscription-based provider of the computing device in accordance with a subscription model, the subscription-based provider of the computing device being a supplier of the computing device to the subscription-based customer; and
wherein the first set of computing resources comprises a full instruction set architecture-based processor and the second set of computing resources comprises a reduced instruction set computer-based processor.

16. The computer program product of claim 15, wherein managing the subscription further comprises causing a change to one or more management functions associated with the one or more second computing tasks in response to a change to the subscription.

17. The computer program product of claim 15, wherein managing the subscription further comprises causing a change to one or more management policies associated with the one or more second computing tasks in response to a change to the subscription.

18. The method of claim 11, wherein the one or more second computing tasks associated with the subscription-based provider of the computing device comprise one or more management functions associated with a subscription between the subscription-based customer and the subscription-based provider for the subscription-based customer to use the computing device.

19. The method of claim 12, wherein the one or more management functions further comprise a usage metering function configured to track usage of one or more of the first set of computing resources in the first computing architecture dedicated to executing the one or more first computing tasks.

20. The computer program product of claim 15, wherein the one or more second computing tasks associated with the subscription-based provider of the computing device comprise one or more management functions associated with a subscription between the subscription-based customer and the subscription-based provider for the subscription-based customer to use the computing device.

\* \* \* \* \*